(12) United States Patent
Wilson et al.

(10) Patent No.: US 11,203,328 B2
(45) Date of Patent: Dec. 21, 2021

(54) VEHICLE DRYING ASSEMBLY

(71) Applicant: National Car Wash Solutions Canada, Inc., Barrie (CA)

(72) Inventors: Travis B. Wilson, Seguin, TX (US); Ankitkumar Shah, Barrie (CA)

(73) Assignee: National Car Wash Solutions Canada, Inc., Barrie (CA)

( * ) Notice: Subject to any disclaimer, the term of this patent is extended or adjusted under 35 U.S.C. 154(b) by 156 days.

(21) Appl. No.: 15/961,987

(22) Filed: Apr. 25, 2018

(65) Prior Publication Data

US 2019/0329738 A1    Oct. 31, 2019

(51) Int. Cl.
*F26B 19/00*    (2006.01)
*B60S 3/00*    (2006.01)
*B60S 3/04*    (2006.01)
*B60S 3/06*    (2006.01)

(52) U.S. Cl.
CPC .............. *B60S 3/002* (2013.01); *B60S 3/042* (2013.01); *B60S 3/066* (2013.01)

(58) Field of Classification Search
CPC .. B60S 3/066; B60S 3/06; B60S 3/048; B60S 3/002; B60S 3/042; B60S 3/047; B60S 3/00

USPC .......... 34/331–333, 329, 666, 339, 353, 355
See application file for complete search history.

(56) References Cited

U.S. PATENT DOCUMENTS

| | | | |
|---|---|---|---|
| 3,750,213 A * | 8/1973 | Hansen | B60S 3/06 15/53.3 |
| 4,104,756 A * | 8/1978 | Gasser | B60S 3/06 118/109 |
| 4,118,820 A * | 10/1978 | Bivens | B60S 3/042 15/53.3 |
| 8,082,618 B2 | 12/2011 | Wentworth et al. | |
| 9,328,959 B2 * | 5/2016 | Wentworth | F26B 5/16 |
| 2009/0205148 A1 | 8/2009 | Wentworth | |
| 2012/0298035 A1 | 11/2012 | MacNeil | |

* cited by examiner

*Primary Examiner* — John P McCormack
(74) *Attorney, Agent, or Firm* — Dinsmore & Shohl, LLP

(57) ABSTRACT

A vehicle drying assembly has a frame defining a path for movement of a vehicle through the drying assembly and a side brush rotatable about a generally horizontal axis. The side brush includes brush segments that extend radially from the axis to contact a side of the vehicle in a direction generally normal to the path, as the first side brush rotates about its generally horizontal axis. The side brush is mounted at a defined height above the ground and at a distance relative to the vehicle along the path, so as to define a no-contact region on the side of the vehicle in which the side brush does not contact the vehicle as the side brush rotates and the vehicle moves through the drying assembly.

20 Claims, 12 Drawing Sheets

VEHICLE DRYING ASSEMBLY

TECHNICAL FIELD

This relates generally to car washes, more particularly, vehicle drying assemblies used in car washes to dry the surface of a vehicle with rotating brushes.

BACKGROUND

In existing car washes, after a vehicle is laundered and rinsed with water, the vehicle exits a wet section of the car wash to be dried or be partially dried. Some car washes use one or more air blowers to dry vehicles as they exit.

To be dried, the vehicle may travel through a series of air blowers. The air blowers blow air onto the vehicle to remove water or moisture from the exterior surface of the vehicle.

However, air blowers may not be sufficient to remove all moisture from the exterior surface of a vehicle, and droplets may remain on the vehicle.

As such, others car washes may use an additional drying station, as for example disclosed in U.S. Pat. No. 9,328,959.

As disclosed, remaining droplets may be removed from the exterior surface of the vehicle by capillary action, for example by manually wiping down the vehicle with an absorptive brush segment such as a chamois cloth.

Other capillary action techniques may be used to remove moisture from the exterior surface of the vehicle, for example, mechanical rotating brushes having brush segments that contact the surface of the vehicle to absorb remaining moisture on the exterior surface of the vehicle.

However, such rotating brushes may pick up contaminants from the remainder of the vehicle. Such contaminants may then disperse along the rotating brush and contaminate the rotating brush, affecting its efficacy in absorbing moisture, and/or resulting in the contaminants being spread onto other sections of the exterior surface of the vehicle that is being dried.

Accordingly, there is a need for drying vehicles with mechanical rotating brushes and avoiding contaminants or vehicle tires from contacting the rotating brushes.

SUMMARY

According to an aspect, there is provided a vehicle drying assembly comprising: a frame defining a path for movement of a vehicle through the drying assembly; a first side brush, rotatable about a generally horizontal axis, the first side brush having a plurality of brush segments that extend radially from the axis to contact a side of the vehicle in a direction generally normal to the path, as the first side brush rotates about its generally horizontal axis; wherein the first side brush is mounted at a defined height above the ground and at a distance relative to said vehicle along said path, so as to define a no-contact region on said side of the vehicle in which the first side brush does not contact the vehicle, as the first brush rotates and the vehicle moves through the drying assembly.

According to another aspect, there is provided a method of drying a vehicle as the vehicle moves along a path, comprising: rotating a side brush about a generally horizontal axis, the side brush having a plurality of brush segments that extend radially from the axis to contact a side of the vehicle in a direction generally normal to the path as the side brush rotates about its generally horizontal axis, and the side brush mounted at a defined height above the ground and at a distance relative to said vehicle along the path, wherein the defined height and the distance relative to said vehicle define a no-contact region on said side of the vehicle in which the side brush does not contact the vehicle, as the brush rotates and the vehicle moves along the path.

Other features will become apparent from the drawings in conjunction with the following description.

BRIEF DESCRIPTION OF THE DRAWINGS

In the figures which illustrate example embodiments.

DETAILED DESCRIPTION

Figure 1:
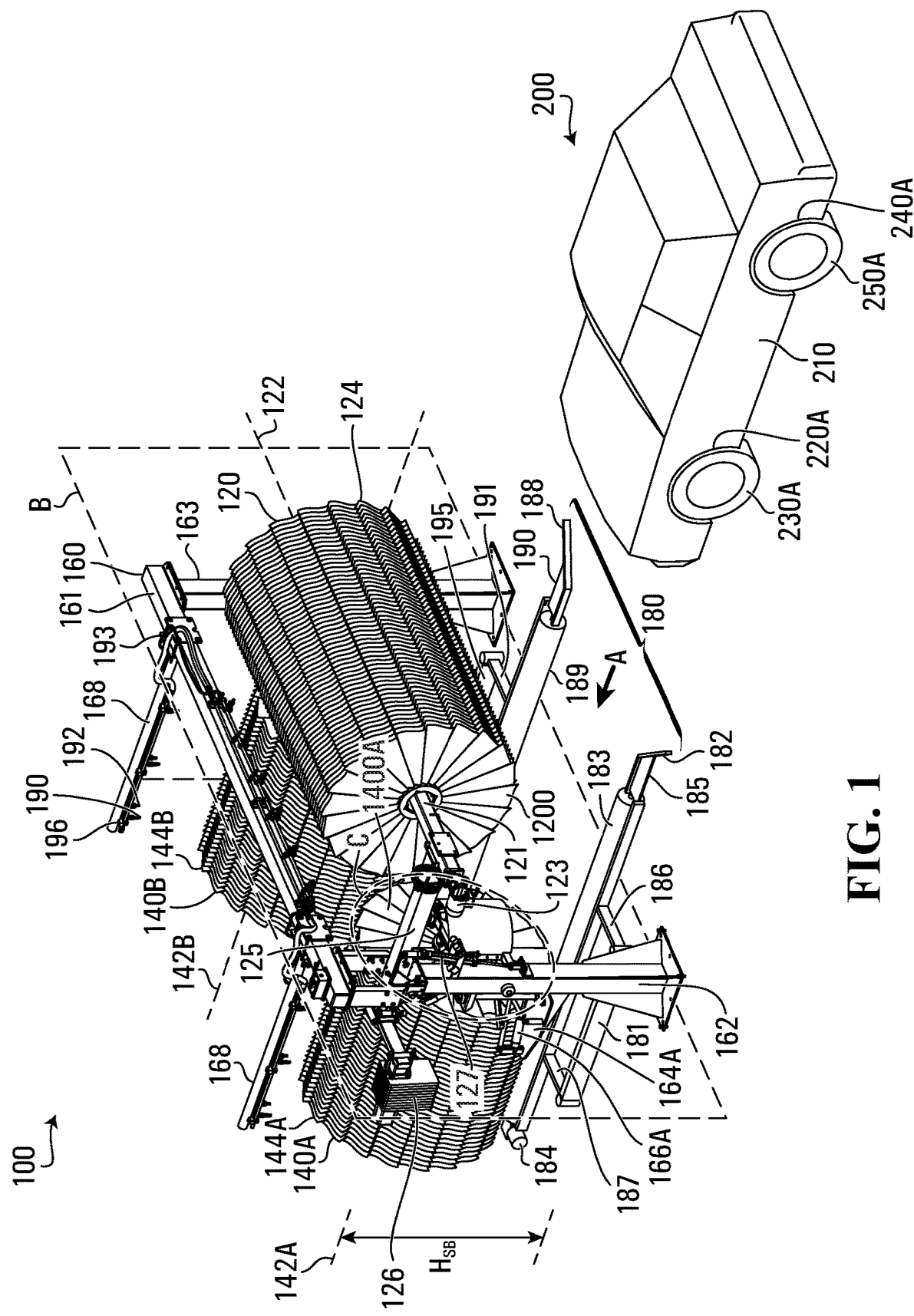
FIG. 1 is a front left perspective view of a vehicle drying assembly of a car wash, in accordance with an embodiment.
Figure 2:
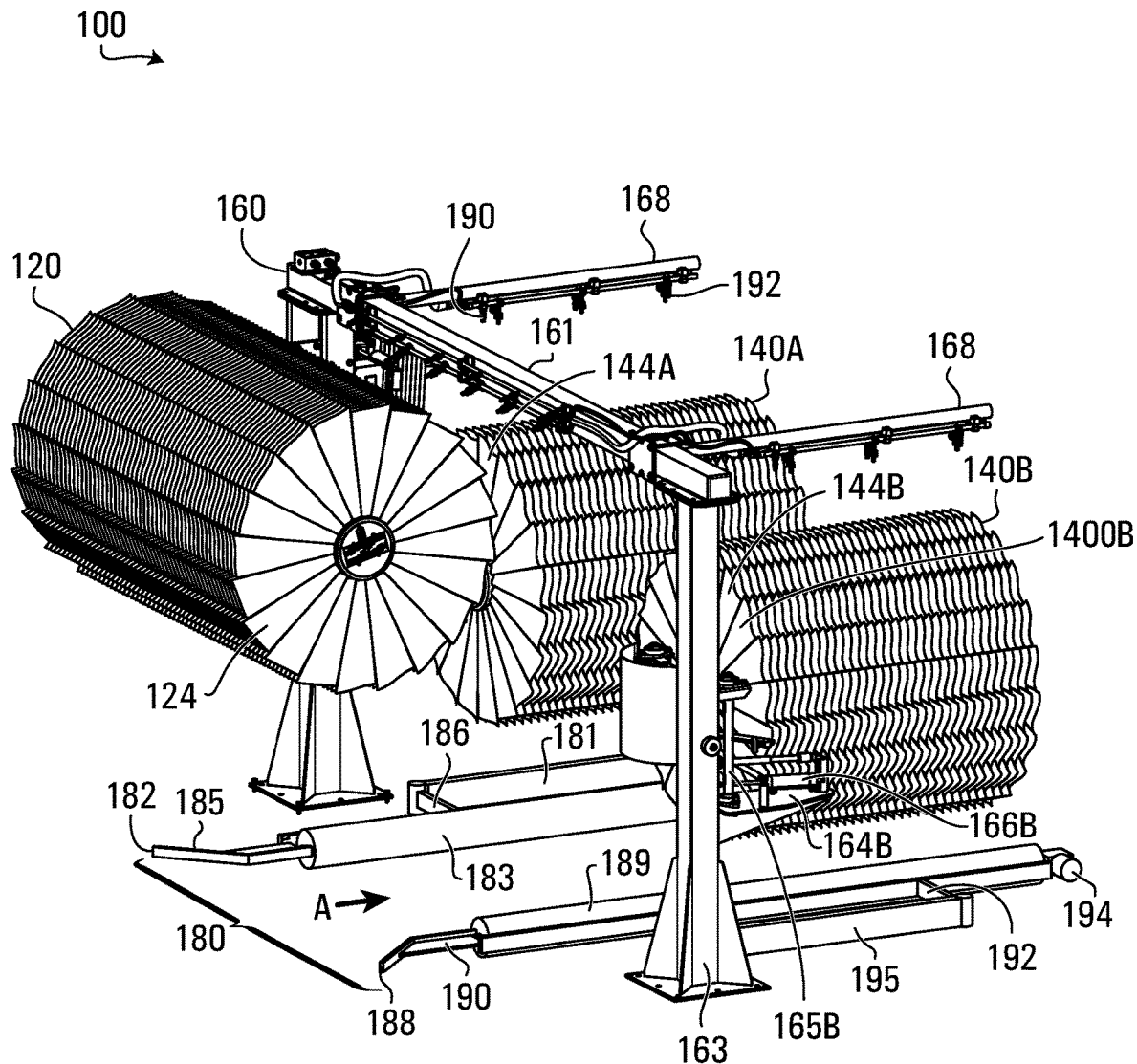
FIG. 2 is a front right perspective view of the vehicle drying assembly of FIG. 1.
Figure 3:
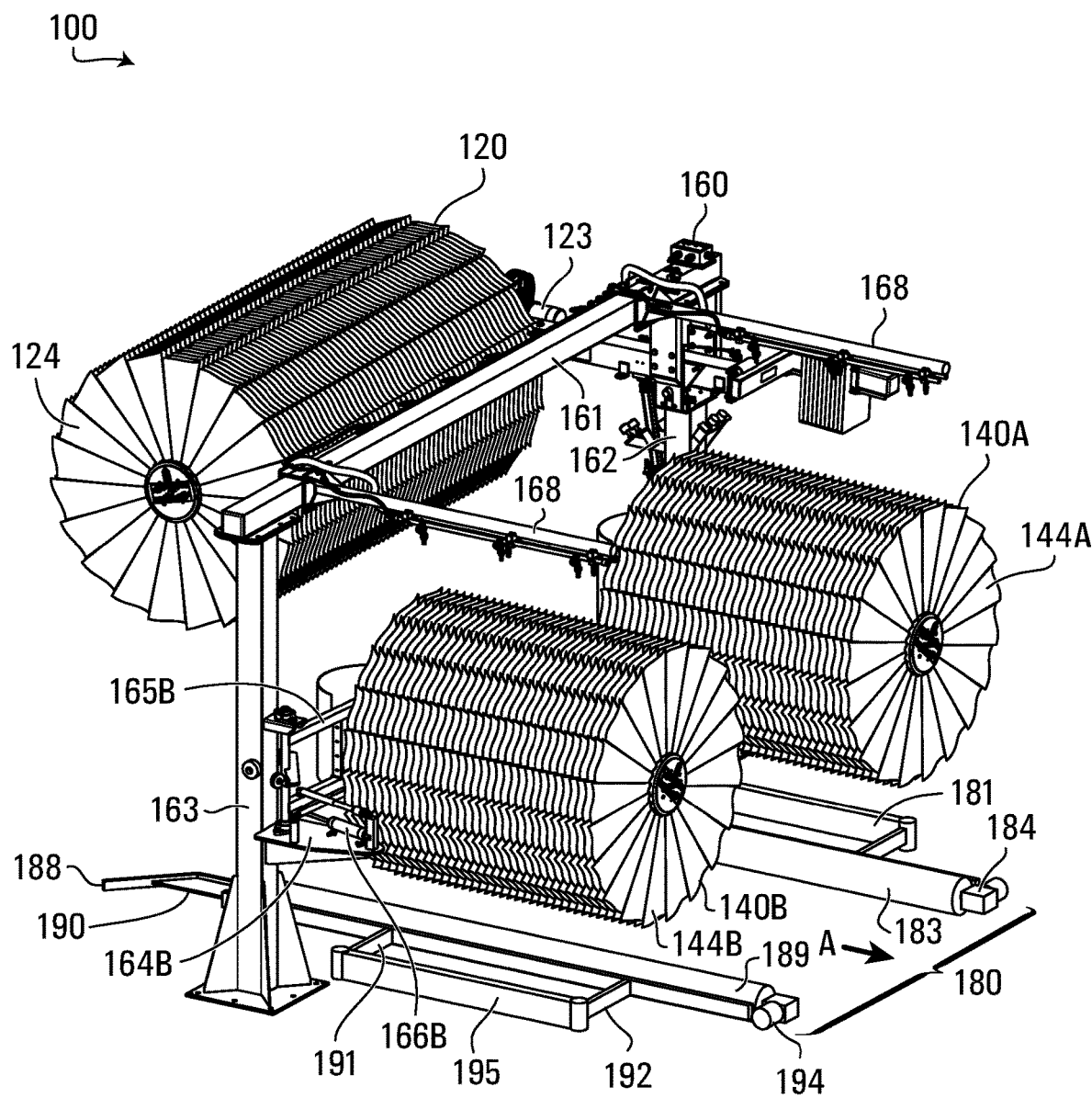
FIG. 3 a rear left perspective view of the vehicle drying assembly of FIG. 1.
Figure 4:
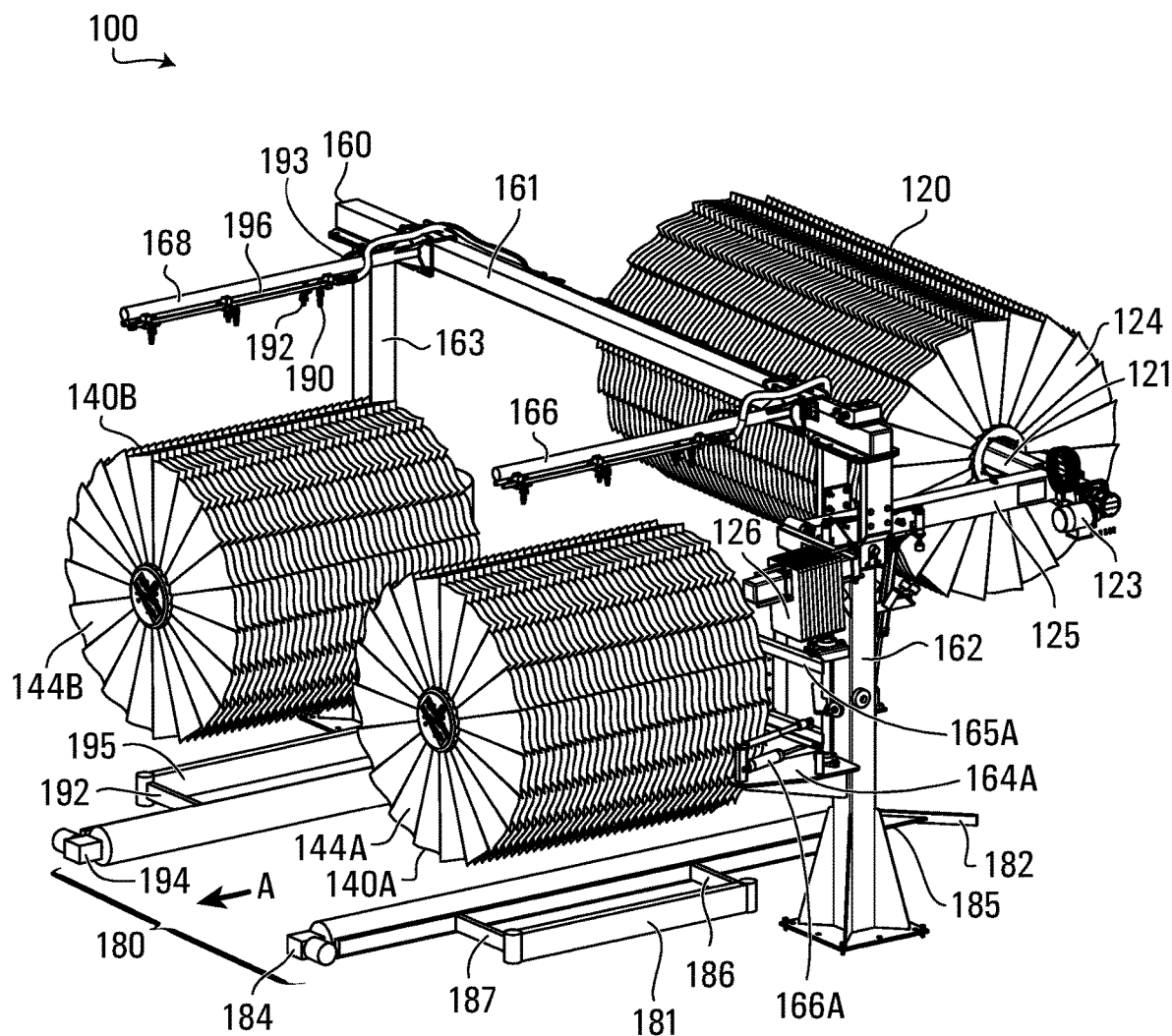
FIG. 4 is a rear right perspective view of the vehicle drying assembly of FIG. 1.
Figure 5:
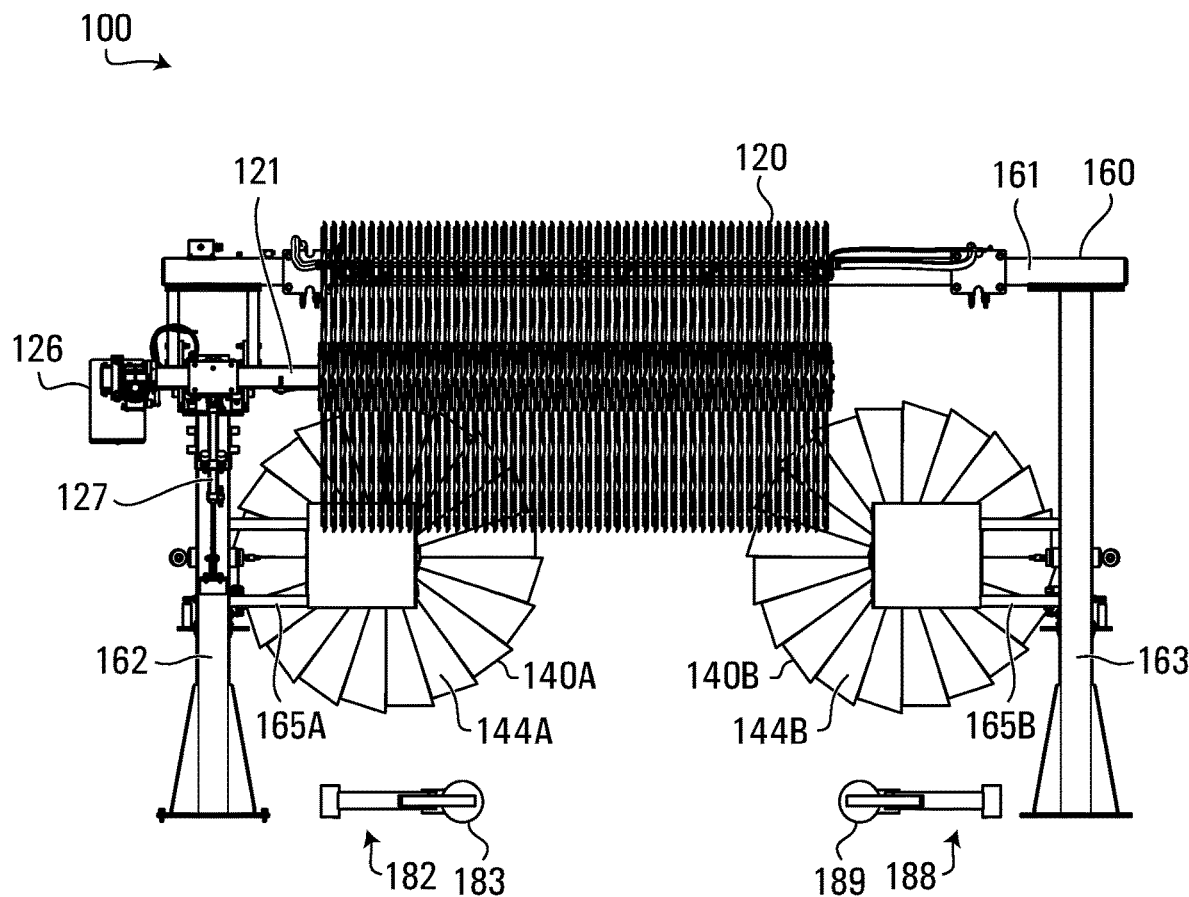
FIG. 5 is a front elevation view of the vehicle drying assembly of FIG. 1.

FIGS. 1 to 9 depict a vehicle drying assembly 100, in accordance with an embodiment. Vehicle drying assembly 100 may be used as the final stage of a car wash, to contact dry a car wash exiting vehicle, and optionally apply a coat of tire shine on the vehicle.

A frame 160 includes a left vertical support 162, a right vertical support 163, and a horizontal support 161 extending laterally between supports 162 and 163. Horizontal nozzle supports 168 extend from cross-support 161.

Tire shine applicators 180A, 180B may be positioned generally beneath side brushes 140A, 140B.

Example vehicle drying assembly 100 includes a rotating top brush 120 and rotating side brushes 140A, 140B mounted to a frame 160.

Left vertical support 162 and right vertical support 163 support side brushes 140A, 140B, respectively.

An example vehicle 200 is also depicted in FIG. 1. Vehicle 200 may be, for example, a passenger car, as illustrated in FIG. 1, a pickup truck, a van, a bus, or any other vehicle sized to make contact with top brush 120 and side brushes 140A, 140B.

Top brush 120 includes a drive shaft (not shown), enclosed within a shaft arm 121. Shaft arm 121 may be formed from structural tubing, for example, a metal with a hollow tubular cross section. The drive shaft rotates about a top axis 122 and is driven by, for example, a motor 123. Other techniques for rotating the drive shaft may be used, as would be known to a person skilled in the art.

Figure 12:
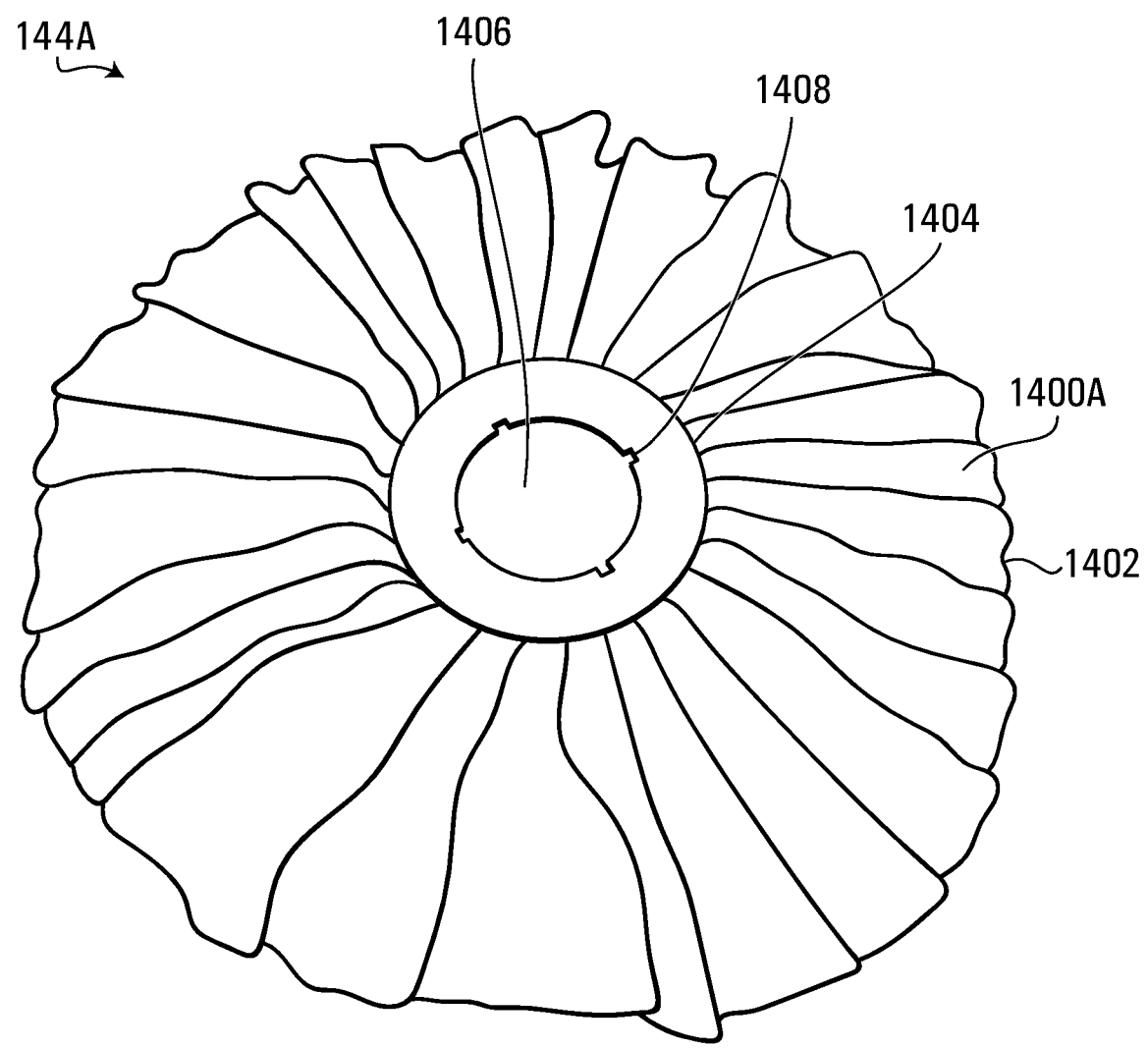
FIG. 12 is a front view of a brush segment having a drying element, in accordance with an embodiment.

As shown in FIG. 1, top brush segments 124 may extend radially from the drive shaft. Top brush segments 124 may connect drying elements 1200 to the drive shaft to form a generally circular envelope, as shown in FIG. 1. Top brush segments 124 may form other envelope shapes, as would be known by a person skilled in the art. Top brush segments 124 may be similar in structure and components to brush segments 140A and drying elements 1400A of side brush 140A, as shown in FIGS. 1 and 12 and described in further detail below.

In some embodiments, for example as shown in FIG. 1, a lever arm 125 may generally form the shape of the letter "L", with shaft arm 121 connected to lever arm 125 at a proximate end, and a counterweight 126 at a distal end. Lever arm 125 may be formed from structural tubing, for example, a metal with a hollow tubular cross section.

As shown in FIG. 1, lever arm 125 connects top brush 120 to frame 160, as lever arm 125 pivots on a fulcrum attached to frame 160. The position of top brush 120 may be adjusted by the position of counterweight 126 and actuation of a top pneumatic cylinder 127, that may thus lift and lower top brush 120.

Left vertical support 162 supports top brush 120 by way of lever arm 125. Lever arm 125 engages with bearings mounted on left vertical support 162, allowing lever arm 125 to pivot. The pivot of lever arm 125 allows for generally vertical movement of top brush 120.

Top pneumatic cylinder 127 is attached between left vertical support 162, and lever arm 125 and a position on lever arm 125 frontward of the fulcrum.

Top pneumatic cylinder 127 may be connected to an air supply (not shown) to operate, and in communication with a controller for top brush 120 (not shown).

The operation of top pneumatic cylinder 127 may be controlled by a controller for top brush 120, which may be, for example, a programmable logic controller (PLC).

In some embodiments, the controller for top brush 120 may detect when a vehicle, such as vehicle 200, approaches vehicle drying assembly 100 by way of sensors such as a camera using image recognition or a sonar sensor.

In some embodiments, the controller for top brush 120 may be able to determine particular characteristics, geometry or size of a vehicle such as vehicle 200 that approaches vehicle drying assembly 100, for example, to differentiate between vehicle types such as passenger cars or pickup trucks. Other vehicle characterizations would be known by a person skilled in the art.

In some embodiments, the controller for top brush 120 may be able to determine a position of vehicle 200 as it approaches vehicle drying assembly 100.

The controller for top brush 120 may be used to adjust the position or vertical height of top brush 120 to allow vehicle 200 to travel below top brush 120 while allowing top brush 120 to come into contact with a top surface of vehicle 200.

As shown in FIG. 1, a side brush mounting platform 164A extends orthogonally and rearwardly from left vertical support 162. Side brush mounting platform 164A may be formed, for example, from a steel plate, and may be reinforced with left vertical support 162 with a flange to act as a stiffener.

Side brush mounting platform 164A may serve as a support mount to hingedly connect side arm 165A at one end to side brush 140A and to hingedly connect side arm 165A at an opposing end to left vertical support 162. Pneumatic cylinder 166A is connected at one end to side brush mounting platform 164A, and at a second, opposite end, to side arm 165A, to actuate side arm 165A.

Side arm 165A may be generally rectangular shaped, as shown in FIG. 1, with a reinforcing strut along the length of side arm 165A, and may be made of steel.

Similarly, side brush mounting platform 164B extends orthogonally and rearwardly from right vertical support 163. Side brush mounting platform 164B is generally identical in structure to side brush mounting platform 164A.

Side brush mounting platform 164B may serve as a support mount to hingedly connect side arm 165B at one end to side brush 140B and to hingedly connect side arm 165B at an opposing end to right vertical support 163. Pneumatic cylinder 166B is connected at one end to side brush mounting platform 164B, and at a second, opposite end, to side arm 165B, to actuate side arm 165B.

As shown in FIG. 1, left vertical support 162 and right vertical support 163 may each have a base plate at the bottom extent. Each base plate may be reinforced with flanges or webs to act as stiffeners, as shown in FIG. 1. The base plates and flanges may be formed, for example, from plate steel.

The base plates attached to left vertical support 162 and right vertical support 163 may be configured to be affixed to the ground, for example, anchored into the ground or a floor of a garage in which vehicle drying assembly 100 is installed.

Horizontal support 161 may attach to and extend between left vertical support 162 and right vertical support 163 and serve to reinforce left vertical support 162 and right vertical support 163. Horizontal support 161 may provide a framework for cleaning nozzles 190 and rinsing nozzles 192 mounted above top brush 120.

Horizontal nozzle supports 168 may extend orthogonally and rearwardly from horizontal support 161, and provide a framework for cleaning nozzles 190 and rinsing nozzles 192 mounted above side brushes 140A, 140B.

The components of frame 160 may be formed from structural tubing, for example, with a hollow tubular cross section of a suitable material, for example, a metal such as steel, as would be known by a person skilled in the art. In some embodiments, components of frame 160 may be formed of material that is circular, cylindrical, square or rectangular in cross-section. In some embodiments, components of frame 160 may be formed of a beam material such as I-beam.

Frame 160 defines an opening in a plane B that permits a vehicle 200 to move relative to vehicle drying assembly 100. Vehicle 200 may move relative to frame 160. As shown in FIG. 1, vehicle 200 enters vehicle drying assembly in the direction of a drying path indicated by arrow A. As shown in FIG. 1 vehicle 200 may have an exterior side surface 210, which forms an opening for wheel wells 220A, 220B, in which wheels with tires 230A and 230B are located.

Side brushes 140A, 140B are each positioned in a generally horizontal position, adjacent to a side of the opening formed by frame 160.

As shown in FIG. 1, side brushes 140A, 140B extend generally orthogonal to plane B, and generally parallel to the travel of vehicle 200.

Figure 7:
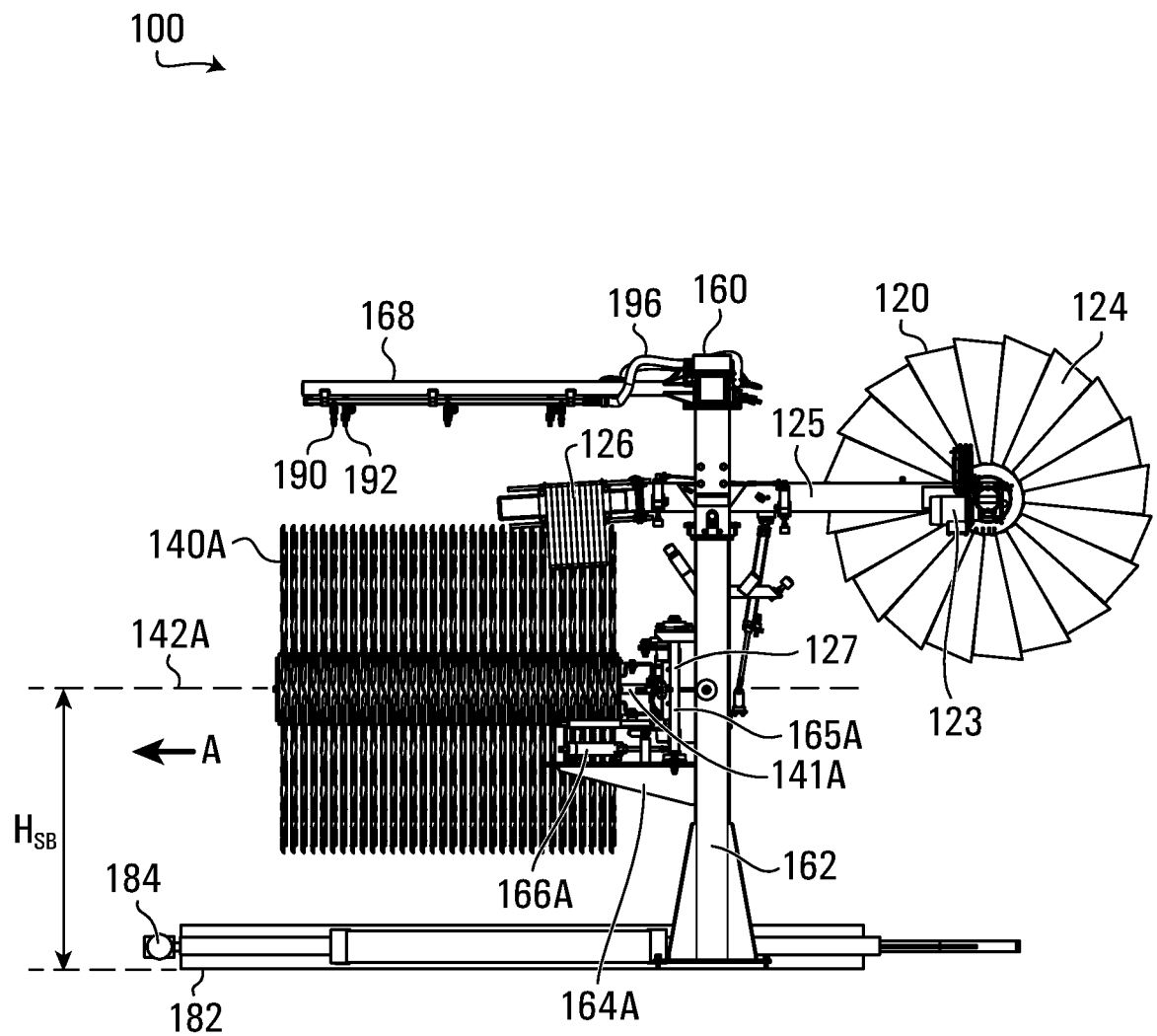
FIG. 7 is a left elevation view of the vehicle drying assembly of FIG. 1.
Figure 8:
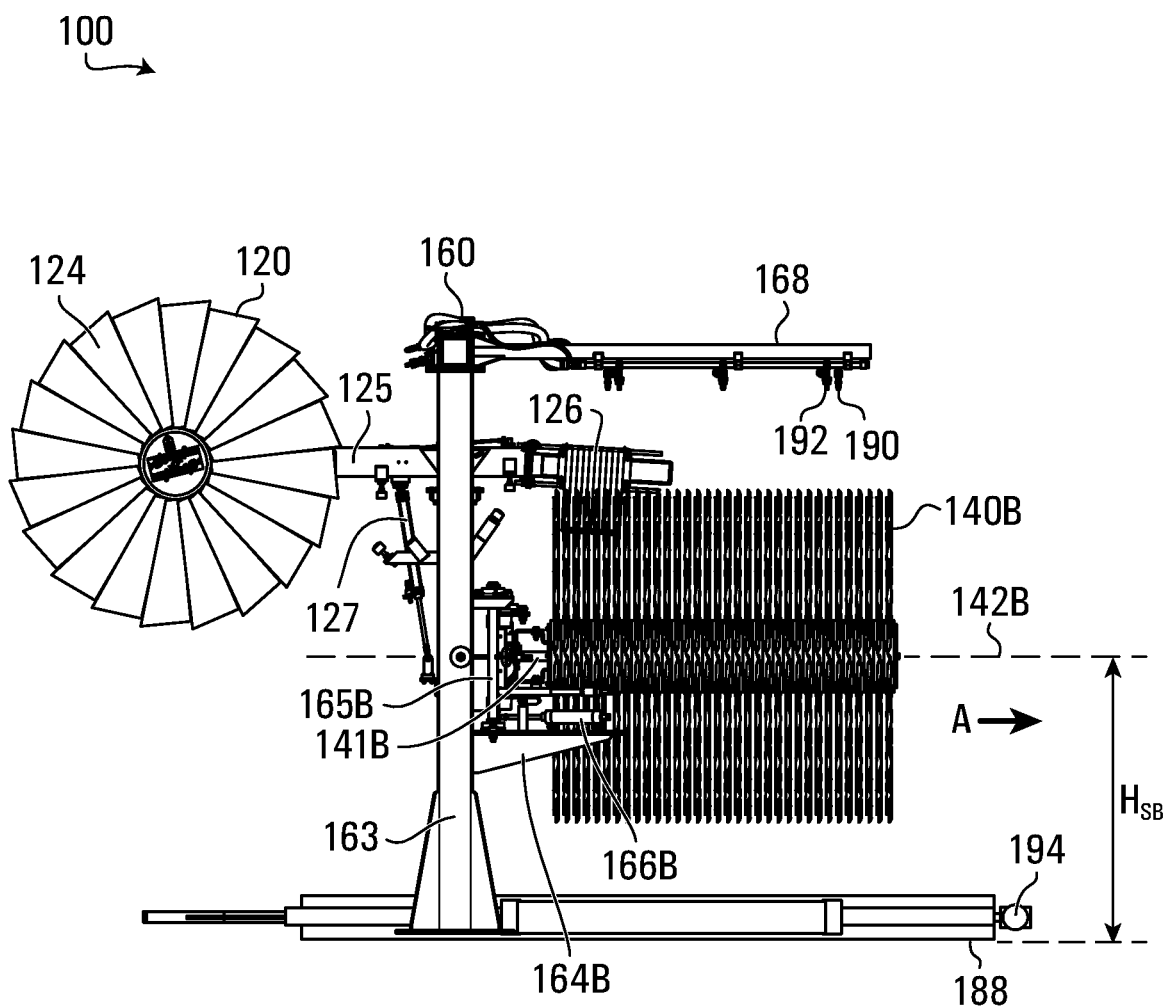
FIG. 8 is a right elevation view of the vehicle drying assembly of FIG. 1.
Figure 9:
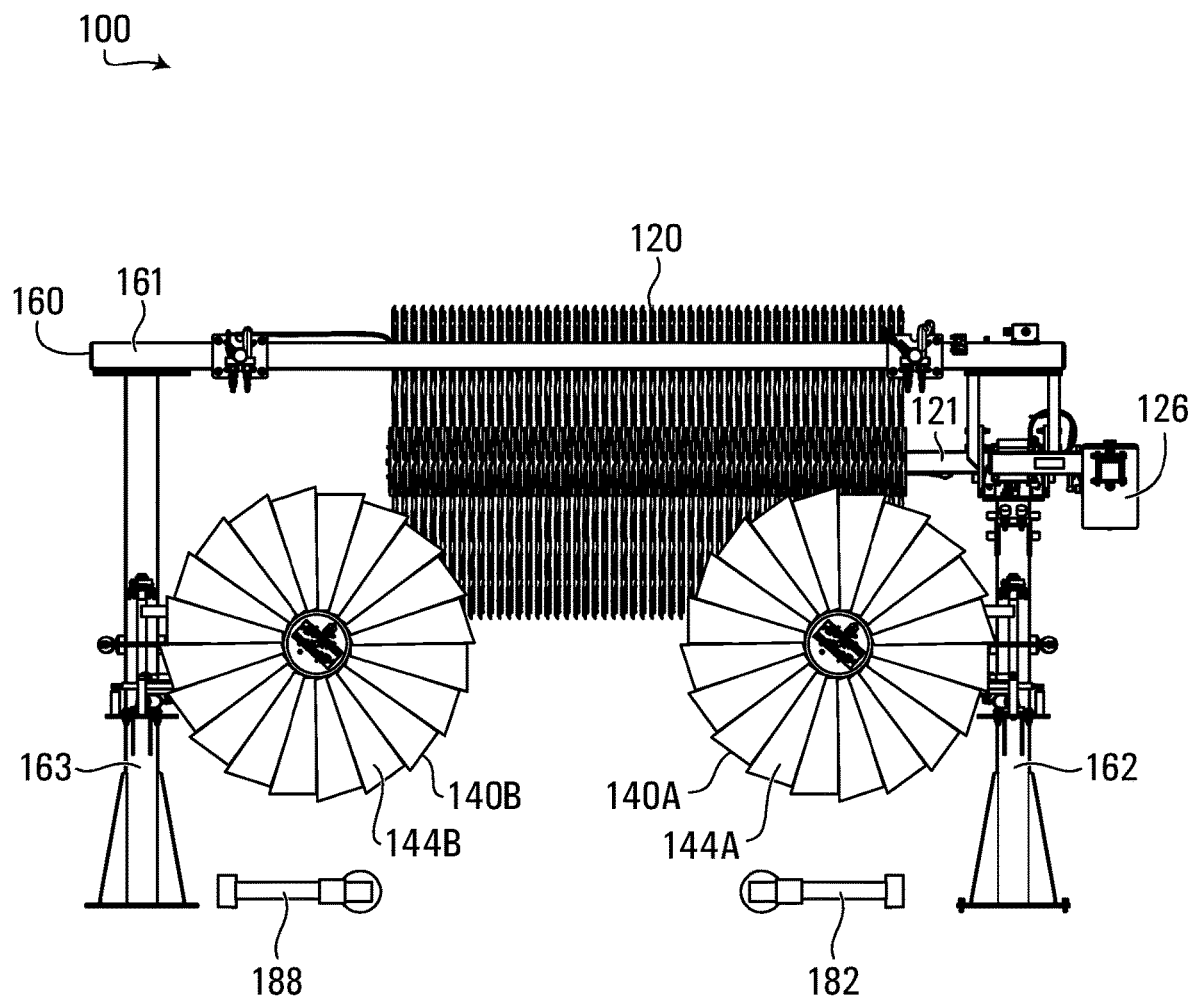
FIG. 9 is a rear elevation view of the vehicle drying assembly of FIG. 1.

As shown in FIGS. 7 and 8, side brush 140A includes a drive shaft 141A. Drive shaft 141A rotates about a left side axis 142A that is generally horizontal and at a predefined vertical height, for example, height $H_{SB}$ from the ground or mounting floor for vehicle drying assembly 100 as shown in FIG. 1. In some embodiments, the predefined height may be, for example, 50 cm above ground. In some embodiments, the defined height may be above the position of wheel wells 220A, 220B of vehicle 200. In some embodiments, the height of left side axis 142A and the distance of left side axis 142A relative to vehicle 200 along its path may be adjustable. In some embodiments, left side axis 142A may be generally perpendicular to top axis 122.

Side brush 140A is thus mounted at a defined height above the ground and at a distance relative to vehicle 200 along its path, so as to define a no-contact region on the side of vehicle 200 in which the side brush does not contact vehicle 200, as vehicle 200 moves through drying assembly 100, as described in more detail below and shown in FIG. 10. In the depicted embodiment, the no-contact region extends along the length of the car, and from the ground to a height that is typically below the position of the axis 142A.

In some embodiments, the defined height that side brush 140A is mounted above the ground and the distance relative to vehicle 200 along its path may be defined with reference to the location of left side axis 142A, in particular the height $H_{SB}$ of left side axis 142A from the ground, and the distance of left side axis 142A relative to vehicle 200 along its path.

In some embodiments, the mounting of side brush 140A at a defined height above the ground and at a distance relative to vehicle 200 along its path is adjustable.

Figure 6:
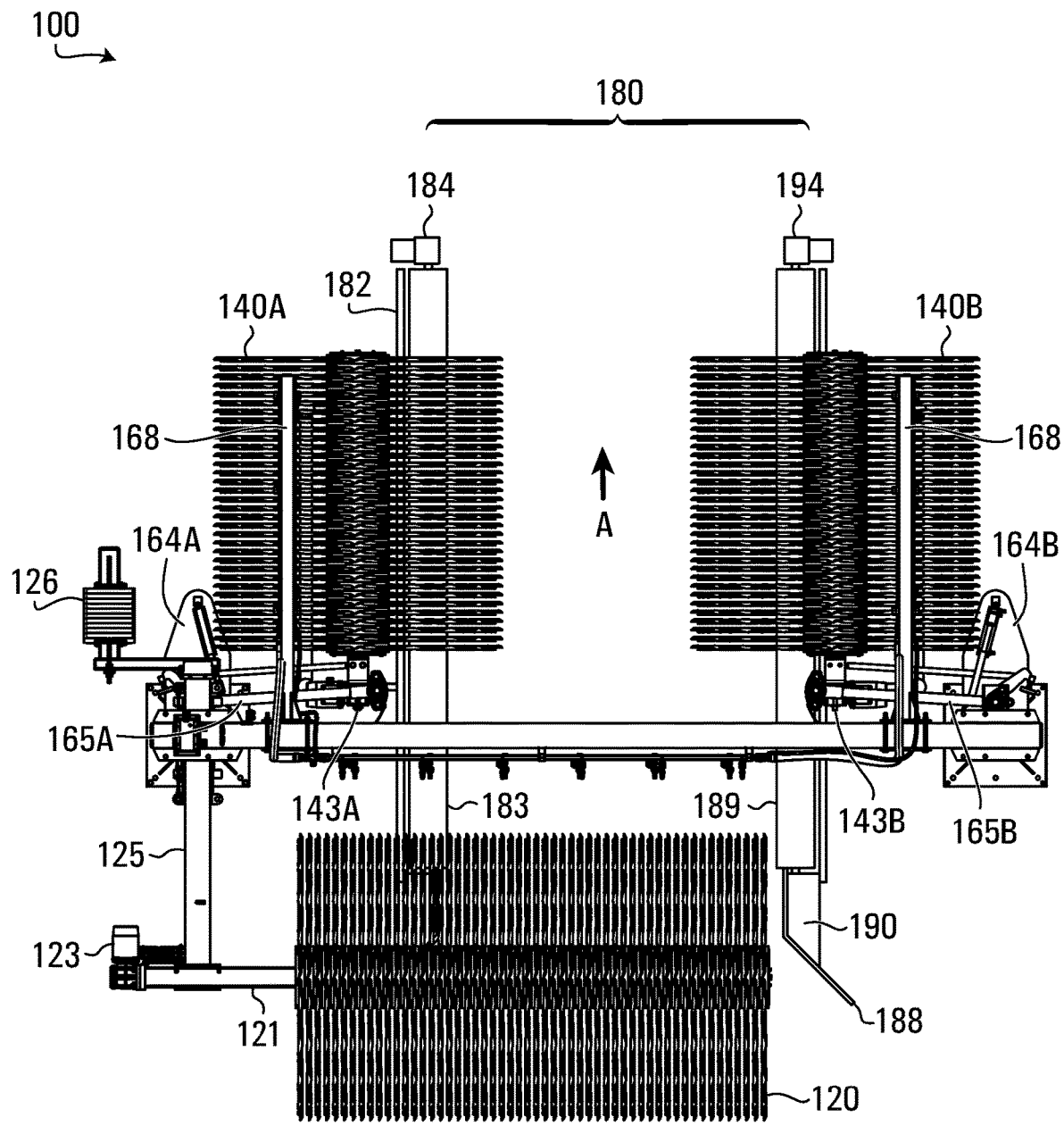
FIG. 6 is a top plan view of the vehicle drying assembly of FIG. 1.

Drive shaft 141A is driven by, for example, a motor 143A (as shown in FIG. 6). Other techniques for rotating drive shaft 141A may be used, as would be known to a person skilled in the art.

The angle at which left side axis 142A intersects plane B may be adjusted by actuation of side arm 165A by pneumatic cylinder 166A.

Side brush 140A may also move laterally relative to side brush mounting platform 164A by way of side arm 165A actuated by pneumatic cylinder 166A.

In some embodiments, as shown in FIG. 1, brush segments 144A extend radially from drive shaft 141A. Brush segments 144A of side brush 140A include drying elements 1400A.

FIG. 12 is a front view of a brush segment 144A having a drying element 1400A, in an embodiment. As shown in FIG. 12, drying element 1400A may be formed of a single generally circular sheet of material, for example, a circular fabric disk, and shaped to form an outer edge 1402. The material of drying element 1400A may be bunched adjacent the center of brush segment 144A, forming a radial pleated or non-pleated and non-regular folding in drying element 1400A, and secured with a circular clinch ring 1404. In some embodiments, drying element 1400 may be formed of more than one piece of material. In some embodiments, brush segment 144A may be formed of multiple strips of fabric or bristles of material extending radially from the drive shaft.

Each drying element 1400A may be formed of an absorptive material that can provide a capillary action to absorb moisture when drying elements 1400A come into contact with moisture, for example, on the exterior of vehicle 200. Drying elements 1400A may be formed, for example, from a chamois cloth, or other suitable woven or non-woven material as would be known to a person skilled in the art. For example, drying elements 1400A may be formed of fabric such as a synthetic microfiber made from, for example, polyesters, polyamides (for example, nylon), or a combination of polyester, polyamide and polypropylene. The shape, size and fiber composition of drying elements 144A may be selected for characteristics such as softness, tear resistance, and absorption.

Drying elements 1400A may be formed of a fabric that has a moderate to high drape, in that the fabric deforms when suspended under its own weight.

In some embodiments, clinch ring 1404 binds drying element 1400A fabric by forming a friction fit with an opposing securing ring, and the fabric inserted in between. Other securing mechanisms would be understood by a person skilled in the art. Clinch ring 1404 may be formed of a suitable material as would be known to a person skilled in the art, such as metal.

Clinch ring 1404 includes an opening 1406 through which brush segment 144A engages with the drive shaft, for example, by way of grooves or notches 1408, engaging with one or more splines or pins in the drive shaft, in a manner to secure brush segment 144A radially and axially to the drive shaft, as would be known by a person skilled in the art.

In some embodiments, more drying element 1400A fabric may be located adjacent the clinch ring 1404 and opening 1406 than adjacent outer edge 1402, which may increase the rigidity of drying element 1400A.

In some embodiments, brush segments 144A of side brush 140A may be separated along the length of side brush 140A by spacers on the drive shaft. In some embodiments, such spacers may be at least one arranged spacer mounted to the drive shaft.

Brush segments 144A extending radially from left side axis 142A may form a generally circular envelope at a radial distance from left side axis 142A, for example envelope shape C, as shown in FIG. 1. Brush segments 144A may form other envelope shapes, as would be known by a person skilled in the art.

Figure 10:
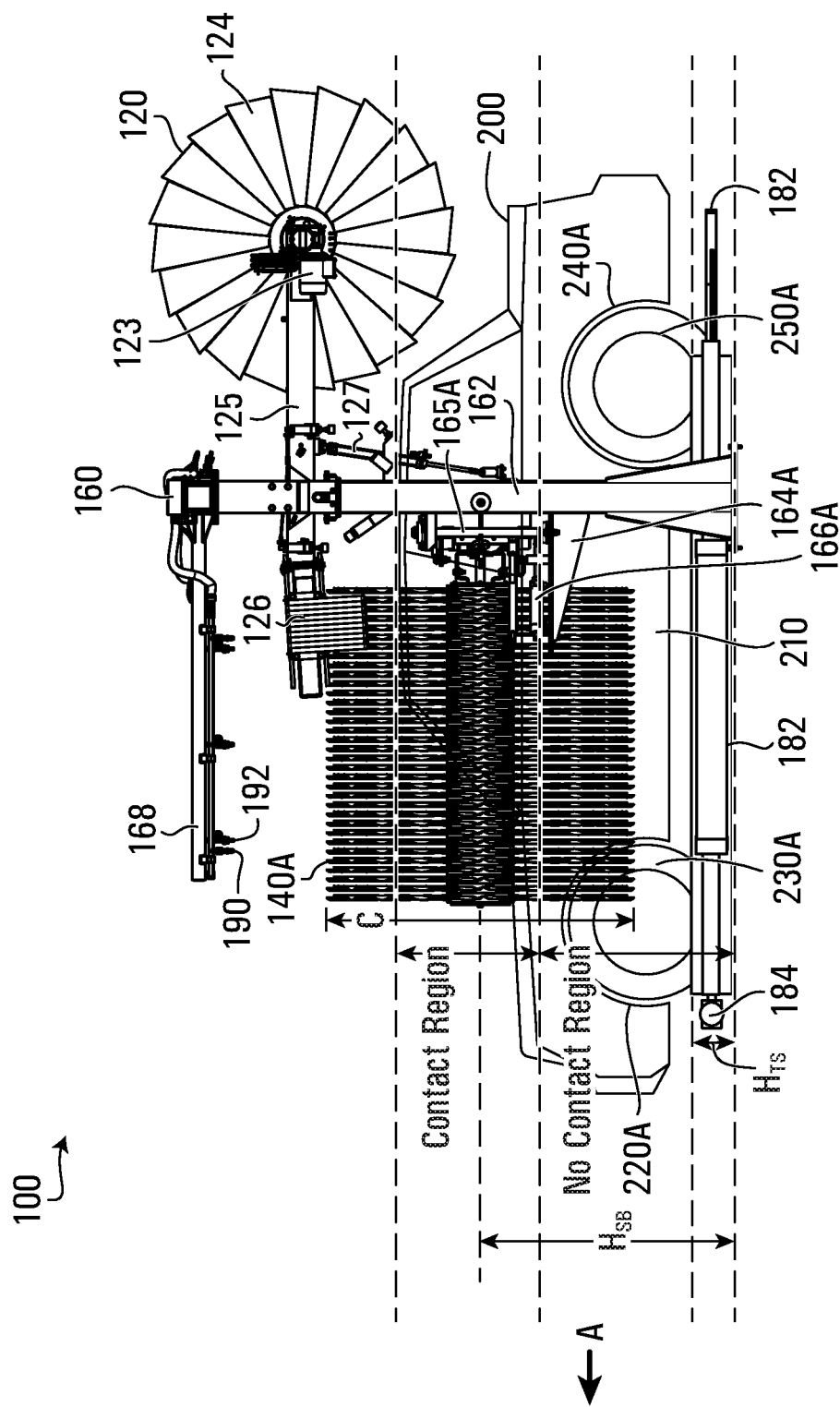
FIG. 10 is a left schematic of the vehicle drying assembly of FIG. 1 with side brushes rotating.

Envelope shape C tangentially contacts side surface 210 of vehicle 200 as vehicle 200 travels through vehicle drying assembly 100, for example, in contact region of side surface 210 of vehicle 200, as shown in FIG. 10 and discussed in further detail below. As seen in FIG. 10, contact region may extend above and below predefined vertical height $H_{SB}$ of left side axis 142A.

The shape of envelope C may deform as side brush 140A is rotating, for example, in embodiments in which drying elements 144A of side brush 140A have a drape characteristic. Brush segment 144A contacts vehicle 200 in a direction generally normal to the path of vehicle 200, as brush segment 144A rotates about its generally horizontal axis. The shape of envelope C may also deform as side brush 140A rotates and contacts side surface 210 of vehicle 200 due to the force applied by side surface 210 to side brush 140A, in forming the contact region.

Side brush 140B is generally identical in structure and components to side brush 140A, in mirror image such that the structure is reversed, as shown in FIG. 1. The components of side brush 140B include brush segment 144B having drying elements 1400B, drive shaft 141B, right side axis 142B, motor 143B and brush segments 144B.

In some embodiments, vehicle drying assembly 100 may include only a single side brush 140A, or multiple side brushes.

Pneumatic cylinders 166A, 166B may be connected to an air supply (not shown) to operate, and in communication with a controller for side brushes 140A, 140B (not shown).

The operation of pneumatic cylinders 166A, 166B may be controlled by a controller for side brushes 140A, 140B, which may be, for example, a programmable logic controller (PLC).

In some embodiments, the controller for side brushes 140A, 140B may detect when a vehicle, such as vehicle 200, approaches vehicle drying assembly 100 by way of sensors such as a camera using image recognition or a sonar sensor.

In some embodiments, the controller for side brushes 140A, 140B may be able to determine particular characteristics, geometry or size of a vehicle such as vehicle 200 that approaches vehicle drying assembly 100, for example, to differentiate between vehicle types such as passenger cars or pickup trucks. Other vehicle characterizations would be known by a person skilled in the art.

In some embodiments, the controller for side brushes 140A, 140B may be able to determine a position of vehicle 200 as it approaches vehicle drying assembly 100.

In some embodiments, the height of side brush 140A above the ground and the distance relative to vehicle 200 along its path may be adjustable based on a detected size of vehicle 200.

In some embodiments, vehicle drying assembly 100 may include one or more tire shiner applicators 180. As shown in FIG. 1, tire shiner applicator 180 includes a left applicator 182 and a right applicator 188. Left applicator 182 may be used to shine tires 230A, 250A of vehicle 200. Right applicator 188 applies shining fluid to vehicle 200 tires 230B, 250B. A suitable tire shine applicator for use as tire shine applicator 180 is, for example disclosed in US Patent Publication No. US 2012/0298035, the contents of which are hereby incorporated by reference.

Tire shiner applicator 180 may be located at a position below side brushes 140A, 140B, in particular below predefined vertical height $H_{SB}$ of left side axis 142A and may furthermore be located at a position below the defined height at which side brushes 140A, 140B are mounted.

Left applicator 182 may have a rotary brush 183 (or other applicator, such as a pad) at tire height (for e.g. tires 230A, 250A) of vehicle 200, mounted on a fixed frame, (e.g., frame 185 as shown in FIG. 1), for the purpose of applying tire-shining solution to tires. Rotary brush 183 is driven by, for example, a motor 184 (as shown in FIG. 1).

Rotary brush 183 may be of sufficient length as vehicle 200 travels in direction A to bring outer sidewall of the tires 230A, 250A of vehicle 200 into contact with the brush rotary brush 183. Rotary brush 183 or applicator may be configured and made of a suitable material such that it can be coated with and provide for suitable distribution of a tire-shining fluid onto a tire that is in contact with the brush/applicator.

A dispensing manifold, located under a cover, may have a plurality of apertures to dispense a tire-shining fluid onto rotary brush 183.

Frame 185 of left applicator 182 may be connected to swivel arms 186, 187 connected to a base 181 and driven, for example, by a motor or pneumatic cylinder, to move rotary brush 183 laterally in the direction of vehicle 200 within vehicle drying assembly 100.

In some embodiments, left applicator 182 of tire shiner applicator 180 may have a height $H_{TS}$ above ground of between 20 cm and 40 cm, for example, $H_{TS}$ may be 25 cm above ground.

Right applicator 188 is similar in structure and components to left applicator 182, in mirror image such that the structure is reversed, as shown in FIG. 1. The components of right applicator 188 include rotary brush 189 driven by motor 194, frame 190, swivel arms 191, 192 connected to a base 195 and driven, for example, by a motor or pneumatic cylinder.

In some embodiments, frame 190 of right applicator and swivel arms 191, 192 may be longer and extend further laterally in comparison to the frame 185 and swivel arms 186, 187 of left applicator 182. In some embodiments, a conveyor may pull the left tire of vehicle 200 through vehicle drying assembly 100, the conveyor mounted adjacent and generally parallel to left applicator 182. To accommodate vehicles of different sizes, the lateral movement of right applicator 188 may be adjustable and have increased range over left applicator 182 to accommodate and access a right set of tires on vehicles of varying sizes, for example, smaller vehicles, that pass through vehicle drying assembly 100.

The operation of tire shiner applicator 180 may be controlled by a controller (not shown), which may be, for example, a programmable logic controller (PLC).

In some embodiments, the controller for operation of tire shiner applicator 180 may be the same controller or interconnected with a controller for at least one of operation of top brush 120, side brushes 140A, 140B.

In some embodiments, a controller (not shown) may operate to coordinate the operation of side brushes 140A, 140B in conjunction with tire shiner applicator 180.

A conveyor (not shown) may run generally parallel to and between tire shiner applicator 180, to carry vehicle 200 through vehicle drying assembly 100 in direction A.

The operation of the conveyor may also be controlled by a controller (not shown), which may be, for example, a programmable logic controller (PLC).

In some embodiments, the controller for operation of the conveyor may be the same controller or interconnected with a controller for at least one of operation of top brush 120, side brushes 140A, 140B, and tire shiner applicator 180.

As shown in FIG. 1, cleaning nozzles 190 and rinsing nozzles 192 are mounted to horizontal support 161 above top brush 120 and to horizontal nozzle supports 168 above side brushes 140A, 140B.

Cleaning nozzles 190 may direct application of a cleaning solution onto top brush 120 and side brushes 140A, 140B. Cleaning solution may be supplied over cleaning solution supply lines 196. Rinsing nozzles 192 may direct application of water onto top brush 120 and side brushes 140A, 140B. Water may be supplied over water supply lines 193.

In use, vehicle 200, for example, after leaving upstream components of a car wash, and having moisture on its exterior surface, travels to or is conveyed to vehicle drying assembly 100 in the direction of arrow A, as shown in FIG. 1.

As vehicle 200 approaches top brush 120, the height of vehicle 200 may be detected to adjust the height of top brush 120, for example, by actuation of top pneumatic cylinder 127, to allow vehicle 200 to travel below top brush 120 while allowing top brush 120 to come into contact with a top surface of vehicle 200.

As vehicle 200 approaches top brush 120, motor 123 may be activated to rotate the drive shaft of top brush 120, and the position of top brush 120 may be further adjusted by actuation of top pneumatic cylinder 127 to contact top brush segments 124 with vehicle 200 for top brush segments 124 to absorb moisture on the top exterior surface of vehicle 200 using capillary action.

As vehicle 200 continues travelling in the direction of arrow A, vehicle 200 becomes aligned with side brushes 140A, 140B.

As shown in FIGS. 1 to 9, vehicle drying assembly 100 may be oriented so that a vehicle 200 entering vehicle drying assembly 100 in direction A contacts top brush 120 before contacting side brushes 140A, 140B.

As side brushes 140A, 140B and top brush 120 are mounted to the same frame 160, and since top brush 120 extends towards the first point of contact for vehicle 200, side brushes 140A, 140B may be oriented such that vehicle 200 first contacts side brushes 140A, 140B adjacent to the location where side brushes 140A, 140B connect to frame 160.

Thus, as vehicle 200 moves in direction A through drying assembly 100, vehicle 200 may exert a lateral force against side brushes 140A, 140B, and the lateral force may be first applied or focused where side brushes 140A 140B are stabilized by frame 160. As vehicle 200 continues to move through vehicle drying assembly 100, vehicle 200 may continue to apply a lateral force to push side brushes 140A, 140B away from vehicle 200.

As vehicle 200 continues travelling in the direction of arrow A, motors 143A, 143B may be activated, to rotate side brushes 140A, 140B, respectively, by way of drive shaft 141A, 141B, respectively. From the perspective of front elevation view shown in FIG. 5, side brush 140A rotates in a clockwise direction, and side brush 140B rotates in a counter-clockwise direction.

Sensors in the controller for side brushes 140A, 140B may then detect the position of vehicle 200 as it approaches vehicle drying assembly 100, and characteristics, geometry and size of vehicle 200.

The position and size of vehicle 200 may then be determined, in some embodiments, in coordination with the controller for the conveyor that moves vehicle 200 in direction A through vehicle drying assembly 100.

Based on the determination of the position and size of vehicle 200, side brushes 140A, 140B may then be positioned, by actuation of pneumatic cylinders 166A, 166B, respectively, at a distance relative to vehicle 200 along direction A to contact brush segments 144A, 144B of side brushes 140A, 140B with side surface 210 and the opposing surface of vehicle 200 to absorb moisture on the exterior surface of vehicle 200 using capillary action.

Side brushes 140A, 140B may be moved laterally toward vehicle 200 until a mechanical stop is reached at a desired position, based on the size of vehicle 200 such that side brushes extend a further distance for a smaller vehicle 200 as compared to a larger or wider vehicle 200. The distance travelled by side brushes 140A, 140B may be based on desired compression of brush segments 144A, 144B, for example, to reduce or avoid undesirable compression of brush segments 144A, 144B that could, for example, affect the quality or durability of drying elements 1400A, 1400B.

In some embodiments, envelope C of rotating side brush 140A may tangentially contact side surface 210 of vehicle 200 in a contact region, as shown in FIG. 10, a schematic of vehicle drying assembly 100 as side brush 140A rotates.

In some embodiments, for example as shown in FIG. 10, contact region may extend horizontally across the length of side brush 140A as it rotates and contacts vehicle 200.

Similarly, the envelope of rotating side brush 140B may contact a contact region on the opposing side surface of vehicle 200.

Side brush 140A may be positioned to avoid contact with wheel wells 220A, 240A, and vehicle wheel tires 230A, 250A, shown in FIG. 10 as no-contact region of vehicle 200.

Since drying element 1400A fabric may have characteristics of drape, the geometry, in particular, the height extent of contact region and no-contact region may be controlled by the position of how close side brush 140A is to vehicle 200. In particular, how much compression the side of vehicle 200 places on the drying elements 1400A. For example, if side brush 140A is positioned closer to vehicle 200, there may be more compression of drying elements 1400A, and therefore a larger contact region may form, and the height of the no-contact region may be reduced.

In use, side brush 140B operates similarly to side brush 140A, as described above, on the opposite side of vehicle 200, and may similarly be positioned to avoid wheel wells and vehicle wheels and tires on the opposing side of vehicle 200.

Thus, as side brush 140A rotates and contacts vehicle 200, the contact region is defined on the surface of vehicle 200. Similarly, as side brush 140B rotates, a contact region is defined on the opposing side surface of vehicle 200.

As vehicle 200 travels in direction A, contacting top brush 120 and side brushes 140A, 140B, tire shiner applicator 180 may also operate. Left applicator 182 may apply tire shiner (e.g. polish, or the like) to tires 230A, 250A, and right applicator 188 may similarly operate to apply tire shiner to tires on the opposing side of vehicle 200.

As vehicle 200 enters vehicle drying assembly 100 in the direction of arrow A, as shown in FIG. 1, and tire 230A, followed by tire 250A, enter vehicle drying assembly 100, left applicator 182 of tire shiner applicator 180 begins dispensing a predetermined volume of fluid, via a dispensing manifold (not shown) onto rotary brush 183.

Motor 184 may be activated to rotate rotary brush 183 of left applicator 182 and motor 194 may be activated to rotate rotary brush 189 of right applicator 188.

A motor or pneumatic cylinder may be activated to drive swivel arms 186, 187 of left applicator 182 to move frame 185 and rotary brush 183 laterally into contact with tires 230A, 250A of vehicle 200. Similarly, a motor or pneumatic cylinder may be activated to drive swivel arms 191, 192 of right applicator 188 to move frame 190 and rotary brush 189 laterally into contact with tires on the opposing side of vehicle 200.

Once in contact, rotating rotary brush 183 may apply fluid such as tire shiner onto tires 230A, 250A. Similarly, rotating rotary brush 189 may apply fluid such as tire shiner onto tires on the opposing side of vehicle 200.

In some embodiments, rotating rotary brush 183 applies fluid onto tires 230A, 250A simultaneously as envelope C of side brush 140A contacts side surface 210. Similarly, in some embodiments, rotating rotary brush 189 applies fluid onto tires on the opposing side of vehicle 200 simultaneously as the envelope of side brush 140B contacts the opposing side surface of vehicle 200.

As shown in FIG. 10, the lowest extent of envelope C, as side brush 140A rotates, may be at a height greater than the height $H_{TS}$ of left applicator 182 of tire shiner applicator 180, and therefore as side brush 140A rotates, side brush 140A does not contact the left applicator 182 of tire shiner applicator 180.

Figure 11:
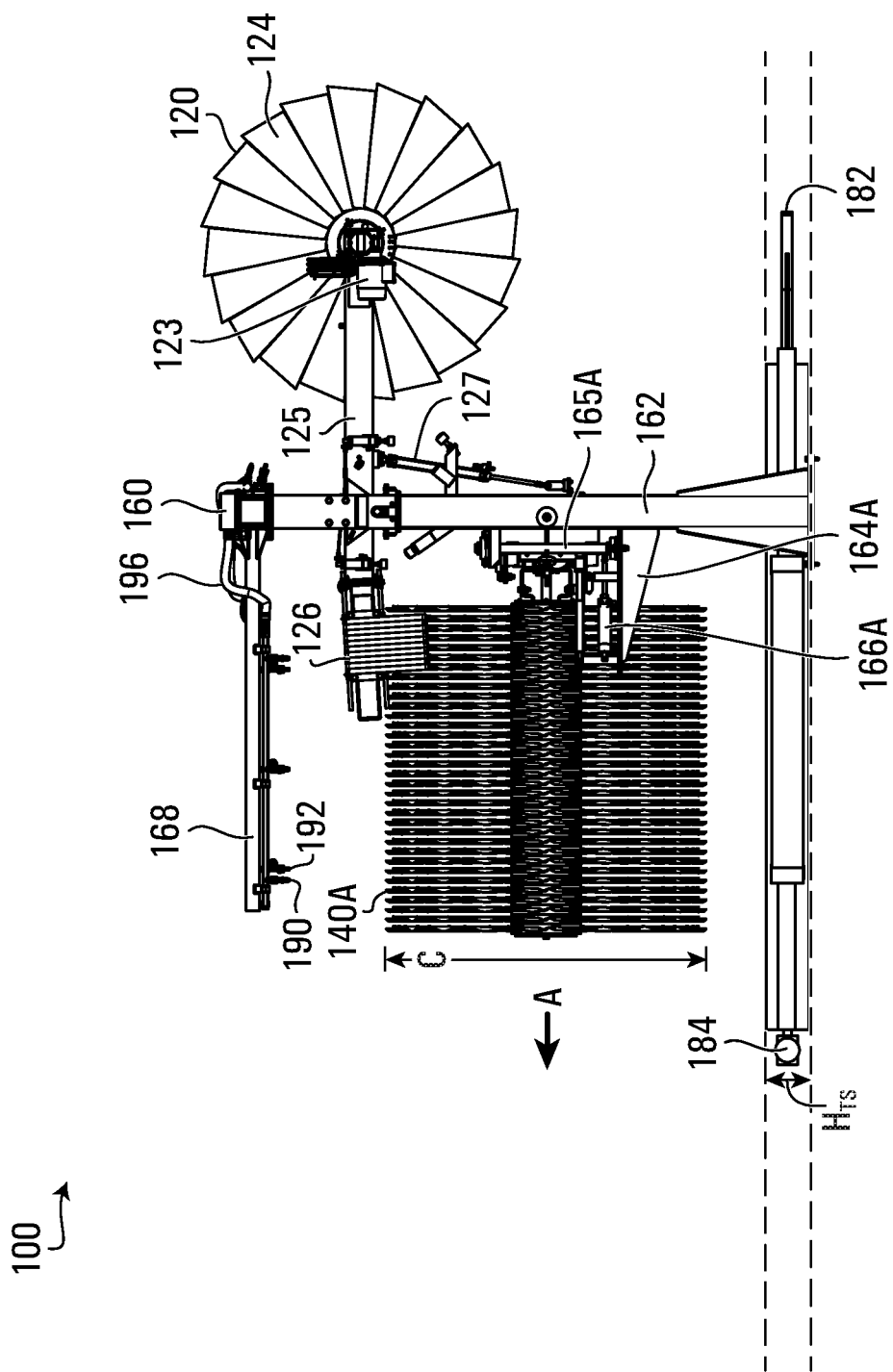
FIG. 11 is a left schematic of the vehicle drying assembly of FIG. 1, with side brushes at rest.

FIG. 11 illustrates a schematic of vehicle drying assembly 100 with side brush 140A at rest. Envelope C, defined when side brush 140A is at rest, is shown in FIG. 11. As shown, the lowest extent of envelope C may be at a height greater than the height $H_{TS}$ of left applicator 182 of tire shiner applicator 180, and therefore at rest, side brush 140A does not contact the left applicator 182 of tire shiner applicator 180.

Similarly, and when side brush 140B is both at rest and rotating, side brush 140B does not contact right applicator 188 of tire shiner applicator 180.

As shown in FIG. 10, left applicator 182 of tire shiner applicator 180 may be positioned to operate such that left applicator 182 contacts no-contact region of side surface 210 of vehicle 200 and applies tire shiner in the no-contact region.

As further seen in FIG. 10, the height above the ground of no-contact region may be greater than the height of left applicator 182 of tire shiner applicator 180, illustrated as $H_{TS}$ in FIG. 10.

Vehicle 200 may continue travelling in direction A to exit vehicle drying assembly 100.

During use, side brushes 140A, 140B and top brush 120 may accumulate dirt or other contaminants. Cleaning nozzles 190 may direct application of a cleaning solution onto side brushes 140A, 140B and top brush 120. Following application of a cleaning solution, rinsing nozzles 192 may direct water to rinse side brushes 140A, 140B and top brush 120.

Conveniently, side brushes 140A and 140B do not come into contact with the tires of vehicle 200 (e.g. tires 230A or 250A) as a result of the no-contact regions resulting from the positioning of the side brushes 140A and 140B, at a defined height above the ground and at distance relative to vehicle 200 along its drying path through assembly 100.

Further, tire shine applicator 180 may operate concurrently with brushes 140A and 140B, allowing the simultaneous application of tire shiner to tires of vehicle 200, while allowing it to be contact dried.

The orientation and position of side brushes 140A, 140B may also allow for side brush 140A and left applicator 182 and side brush 140B and right applicator 188 to be placed conterminously along direction A, for example, side brush 140A above left applicator 182 and side brush 140B above right applicator 188, as shown in FIGS. 1 to 9. This may allow for a savings of space in a tunnel used to house vehicle drying assembly 100, instead of side brushes 140A, 140B being positioned sequentially in front of left applicator 182 and right applicator 188, respectively, of tire shiner applicator 180 in direction A.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A vehicle drying assembly comprising:
   a frame defining a path for movement of a vehicle through the drying assembly;
   a first side brush, rotatable about horizontal axis that is parallel to the ground, the first side brush having a plurality of brush segments that extend radially from the axis to contact a side of the vehicle in a direction generally normal to the path, as the first side brush rotates about its horizontal axis said brush segments formed of an absorptive material adapted to provide a capillary action to dry the vehicle as the first side brush rotates about its horizontal axis;
   wherein the first side brush is mounted at a defined height above the ground and at a distance relative to said vehicle along said path, so as to define a no-contact region on said side of the vehicle in which the first side brush does not contact the vehicle, as the first side brush rotates and the vehicle moves through the drying assembly; and
   wherein the vertical position of the horizontal axis is adjustable.

2. The vehicle drying assembly of claim 1, further comprising a plurality of pneumatic cylinders to adjust the lateral position of the first side brush.

3. The vehicle drying assembly of claim 1, wherein the defined height is at least 50 cm above ground.

4. The vehicle dying assembly of claim 1, wherein the defined height is at a height above a wheel well formed in said side of the vehicle.

5. The vehicle drying assembly of claim 1, further comprising a tire shiner assembly located at a position below said horizontal axis to apply a tire shine product to a tire of the vehicle as the vehicle moves through the drying assembly.

6. The vehicle drying assembly of claim 5, wherein the defined height is above a height of the tire shiner.

7. The vehicle drying assembly of claim 6, wherein the plurality of brush segments that extend radially from the axis define a radial envelope of the first side brush at rest, and the first side brush is mounted at the defined height above the ground and at the distance relative to said vehicle along said path such that the lowest extent of the radial envelope is at a height greater than the height of the tire shiner.

8. The vehicle drying assembly of claim 5, wherein the tire shiner assembly is located at the position below said horizontal axis to contact the no-contact region of said side of the vehicle.

9. The vehicle drying assembly of claim 5, wherein a height above the ground of the no-contact region is greater than a height of the tire shiner.

10. The vehicle drying assembly of claim 1, further comprising a motor for rotating the first side brush about the axis.

11. The vehicle drying assembly of claim 1, further comprising a second rotatable side brush, rotatable about a second horizontal axis that is parallel to the ground, the second side brush having a second plurality of brush segments that extend radially from the second horizontal axis to contact a second side of the vehicle, opposite said side contacted by the plurality of brush segments of the first side brush in a direction generally normal to the path, as the second side brush rotates about its horizontal axis; wherein the second side brush is mounted at a defined height above the ground and at a distance relative to said vehicle along said path, so as to define a second no-contact region on said second side of the vehicle in which the second side brush does not contact the vehicle, as the vehicle moves through the drying assembly.

12. The vehicle drying assembly of claim 11, further comprising a top brush, rotatable about a top axis, generally perpendicular to the horizontal axis and the second horizontal axis, and wherein the top brush has a plurality of top brush segments extending radially from the top axis.

13. The vehicle drying assembly of claim 12, further comprising a plurality of cleaning nozzles to dispense a cleaning solution onto at least one of the first side brush, the second side brush and the top brush.

14. The vehicle drying assembly of claim 13, further comprising a plurality of rinsing nozzles to dispense water onto at least one of the first side brush, the second side brush and the top brush.

15. The vehicle drying assembly of claim 1, wherein the distance of the first side brush relative to said vehicle along said path is adjustable.

16. The vehicle drying assembly of claim 15, wherein the distance of the first side brush relative to said vehicle along said path is adjustable based on a detected size of the vehicle.

17. A method of drying a vehicle as the vehicle moves along a path, comprising:
   rotating a side brush about a horizontal axis that is parallel to the ground, the side brush having a plurality of brush segments that extend radially from the axis to contact a side of the vehicle in a direction generally normal to the path as the side brush rotates about its horizontal axis to dry the vehicle as the brush rotates about the horizontal axis, and the side brush mounted at a defined height above the ground and at a distance relative to said vehicle along the path, wherein the defined height and the distance relative to said vehicle define a no-contact region on said side of the vehicle in which the side brush does not contact the vehicle, as the side brush rotates and the vehicle moves along the path; and wherein the vertical position of the horizontal axis is adjustable concurrently applying a tire shine product to a tire of the vehicle using a tire-shine assembly, located beneath said first side brush, as the vehicle moves through the drying assembly while the first side brush rotates about the horizontal axis and dries the vehicle.

18. The method of claim 17, further comprising:

detecting a size of the vehicle; and adjusting the distance relative to said vehicle based on the size of the vehicle.

19. A vehicle drying assembly comprising:

a frame defining a path for movement of a vehicle through the drying assembly;

a first side brush, rotatable about a horizontal axis that is parallel to the ground, the first side brush having a plurality of brush segments that extend radially from the axis to contact a side of the vehicle in a direction generally normal to the path, as the first side brush rotates about the horizontal axis wherein the brush segments are formed of an absorptive material that provides capillary action adapted to dry the vehicle as the first side brush rotates about the horizontal axis and the brush segments contact the vehicle;

wherein the first side brush is mounted at a defined height that is above the height of a wheel well of said vehicle and at a distance relative to said vehicle along said path, so as to define a no-contact region on said side of the vehicle in which the first side brush does not contact the vehicle, as the first side brush rotates and the vehicle moves through the drying assembly a tire shiner assembly located at a position below said horizontal axis to apply a tire shine product to a tire of the vehicle as the vehicle moves through the drying assembly while the first side brush dries the vehicle.

20. The vehicle drying assembly of claim 19, wherein the defined height is at least 50 cm above ground.

* * * * *